Jan. 20, 1925.

B. M. W. HANSON

MAGNETIC CHUCK

Filed March 31, 1921

1,523,770

Inventor
Bengt M. W. Hanson
By
His Attorney

Patented Jan. 20, 1925.

1,523,770

UNITED STATES PATENT OFFICE.

BENGT M. W. HANSON, OF HARTFORD, CONNECTICUT.

MAGNETIC CHUCK.

Application filed March 31, 1921. Serial No. 457,338.

*To all whom it may concern:*

Be it known that I, BENGT M. W. HANSON, a citizen of the United States, and resident of Hartford, county of Hartford, State of Connecticut, have invented certain new and useful Improvements in a Magnetic Chuck, of which the following is a specification.

The object of this invention is to produce a magnetic chuck having features of novelty and advantage. It is especially designed to provide a chuck, the active face of which shall be made up of a plurality of sections each of which may be separately magnetized and the magnetic effects separately controlled. The embodiment of the invention selected for illustration and description is of a rotary spindle with parts constituting the magnetic chuck built directly into the end of the spindle, and the disclosure of the invention will be based upon this embodiment. It will, of course, be evident that the invention, as set forth in the appended claims, is susceptible of use in other arrangements than that herein illustrated.

In the drawing:—

Figures 1, 2, 3:
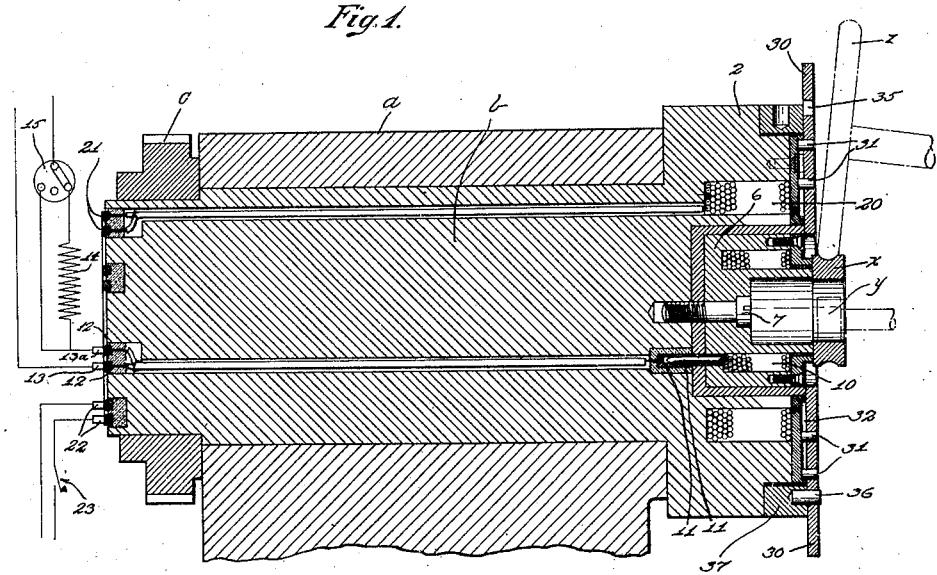
Fig. 1 is a central vertical section of a chuck made in accordance with my invention, and taken on line 1—1 of Fig. 2
Fig. 2 is an end view thereof.
Fig. 3 is an enlarged detail view taken on line 3—3 of Fig. 2.

Referring to the drawing, *a* is a bearing and *b* is a chuck rotatably mounted therein driven from some suitable source of power as through the gear *c*. The end of the spindle constitutes a chuck face and, as here shown, is made up of two parts, an outer section 2 with a central recess within which is fitted a central chuck block 6 which constitutes the inner or central section of the chuck face and is removably positioned therein and may be held in place as by the screw bolts 7.

10 denotes a magnetizing coil fitted into the central chuck block 6 and connected through the contact members 11 with circuit wires leading to contacts 12, 12, at the rear of the spindle which are provided with brushes 13, 13ª in the circuit of one of which a resistance 14 is located in order that the strength of the magnetic force in the chuck block 6 can be varied for purposes which will be hereinafter described. This circuit is controlled by a proper switch 15 in order that the current can be delivered to the coil 10 either directly or through the resistance 14. 20 denotes a magnetizing coil in the outer section 2 of the chuck face and connected by circuit wires with contact rings 21, 21, and brushes 22, 22, equipped with a proper switch 23 for controlling the current supplied to the coil 20.

It will be seen from this description that the chuck face comprises two sections insulated from one another, that each section may be separately magnetized and that in one of the sections, as the central one here illustrated, the magnetic effect can be varied.

At the end of the outer chuck section 2 are a pair of oppositely arranged plates 30, 30, adapted to slide towards and away from one another, being guided by pins 31, 31 riding in slots 32, 32 and held in place by the headed screw bolts 33, 33. Angular slots 35 in the outer ends of these plates receive pins 36 carried by a ring 37 which is rotatable on the chuck, being so arranged that the rotation of this ring will cause the plates to move either outwardly or inwardly as desired.

The piece of work, here shown as a bearing ring *x*, is positioned against the central chuck block 6 and a light current is thrown into the coil to produce sufficient magnetism to hold the piece in place but permitting it to be shifted until it is percisely centered relative to the spindle. Then, by further action of the switch 15, the resistance is cut out, delivering more current to the coil and consequent greater magnetic effect to hold the piece in position. The adjusting ring 37 is now turned to bring the holding plates 30, 30, down into contact with the sides of the work as shown, these holding plates having V-shaped jaws so as to firmly hold the work against movement in any direction. When these plates are brought up into contact with the work, the switch 23 is operated to throw the current into the coil 20 in the outer chuck section 2 producing a very heavy magnetic effect which operates over the large area of the holding plates 30 which lie against the end of the outer chuck section 2, thus firmly securing these holding plates against movement and so preventing any movement of the work when the pressure of the tool is applied thereto.

It will be seen from the foregoing that the work is directly held by the magnetic effect in the central magnetic chuck block 6, and at first is lightly held in order that it may be centered properly with relation to the spindle, after which the full current is turned into the coil 10 in this central portion. Then the holding plates are shifted to position to hold and support the work against lateral displacement and current turned into the coil of the outer chuck section 2 to hold the plates 30, 30, and so position the work with great security.

A chuck of this sort finds peculiar utility in permitting of machining a piece of work both internally and externally at the same time, where an accurate relationship between the finished surfaces is of great importance. Take for instance the case of the bearing ring illustrated where the hole through the ring must be accurately finished to fit a shaft and the exterior of the ring must be accurately finished with respect to the interior in order to make sure that when the ring is mounted on the shaft its outer surface will run absolutely true. In the drawings, I have illustrated such a bearing ring with two tools operating on it. A finishing tool, such as a grinding wheel, for the bore of the ring is shown at $y$ and a wheel for grinding the races is shown at $z$. It will be apparent that both of these operations can be carried on simultaneously at one and the same setting of the work, and consequently identical results will be attained both in the bore and on the exterior of the ring, the two surfaces being of necessity precisely concentric.

Obviously, the tool for finishing the interior must be able to pass through the work to a substantial extent and for this reason the central chuck block is recessed as at 9. This recess should always be a little larger than the work so that the tool as it runs through will not contact with the chuck block and for this reason the entire chuck block 6 can be made removable in order to provide a variety of sizes of recesses as may be required.

It is, of course, obvious that my invention is susceptible of various modifications and changes which are within the spirit of the invention without departing from the scope of the following claims, it being understood that the present disclosure of my invention is by way of illustration only and it is not to be taken as restrictive of my conception.

I claim as my invention:

1. In a device of the character described, a chuck face comprising a plurality of sections and means for separately magnetizing said sections; and a work supporting device associated with one of said sections and adapted to be held by the magnetic effects produced in said section.

2. A device of the character described comprising a chuck face made up of separate sections with means for separately magnetizing said sections, one of said sections being adapted to directly hold a piece of work by the magnetic effects within the said section, and supporting devices for said work associated with the other section and adapted to be held by the magnetic forces therein.

3. A device of the character described comprising a chuck face made up of separate sections with means for separately magnetizing said sections, one of said sections being adapted to directly hold a piece of work by the magnetic effects within the said section, supporting devices for said work associated with the other section and adapted to be held by the magnetic forces therein, and means for varying the magnetic effect in that section adapted to directly hold the work.

4. A magnetic chuck comprising a plurality of sections with means for separately magnetizing each section, work supporting plates associated with one of said sections, and means for holding said plates for sliding movement relative to said section, said plates being held against movement relative to the section with which they are associated with by the magnetic effects produced in said section.

5. A magnetic chuck comprising a pair of sections, one within the other, means for separately magnetizing said sections, the inner one of said sections being adapted to directly hold a piece of work by the magnetic effects within said section, and plates supported for sliding movement along the face of the outer section and to and from the inner section, said plates adapted to be held against movement by the magnetic forces produced in said outer section.

6. A device of the character described comprising a chuck face made up of separate sections with means for separately magnetizing said sections, one of said sections being adapted to directly hold a piece of work by the magnetic effects within said section, supporting devices for said work associated with the other section and adapted to be held by the magnetic forces therein, and means for moving said devices in unison.

7. A magnetic chuck comprising a pair of sections, one within the other, means for separately magnetizing said sections, the inner one of said sections being adapted to directly hold a piece of work by the magnetic effects within said section, plates supported for sliding movement along the face of the outer section and to and from the inner section, and means for moving said plates in unison, said plates adapted to be held against movement by the magnetic forces produced in said outer section.

8. A magnetic chuck comprising a pair of sections, one within the other, means for separately magnetizing said sections, the inner one of said sections being adapted to directly hold a piece of work by the magnetic effects within said section, plates supported for sliding movement along the face of the outer section and to and from the inner section, a ring having rotary movement relative to said sections, and connections between said ring and plates for moving the latter in unison upon actuation of said ring, said plates adapted to be held against movement by the magnetic forces produced in said outer section.

9. In a device of the character described, a spindle having a chuck face of two sections, one within the other, a separate coil associated with each section for magnetizing the same, a pair of oppositely arranged plates supported by the outer section for sliding movement towards and away from each other, said plates having angular slots in their outer ends, and a rotatable ring about said chuck face provided with pins engaging in said slots.

10. A magnetic chuck, comprising a pair of sections, one within the other, means for separately magnetizing said sections, the inner one of said sections being adapted to directly hold a piece of work by the magnetic effects within said section, and work-supporting devices associated with the outer of said sections and adapted to be held by the magnetic forces therein.

11. A rotary magnetic chuck comprising a pair of sections one within the other, means for separately magnetizing said sections, the central section being removable and having an axial unfilled recess in its face, and work supporting devices associated with the outer section.

12. A magnetic chuck, comprising a rotary spindle having a chuck face made up of two sections, the outer section being provided with a central recess within which is fitted a central chuck block, said central chuck block being removable and having a centrally disposed recess, and supporting devices for the work associated with the outer section and adapted to be held by the magnetic forces therein.

BENGT M. W. HANSON.